United States Patent [19]

Matzner et al.

[11] Patent Number: 4,508,679
[45] Date of Patent: Apr. 2, 1985

[54] NUCLEAR FUEL ASSEMBLY SPACER

[75] Inventors: Bruce Matzner; Victor M. Horn; Michael V. Curulla, all of San Jose, Calif.; John F. Price, Wilmington, N.C.

[73] Assignee: General Electric Company, San Jose, Calif.

[21] Appl. No.: 410,124

[22] Filed: Aug. 20, 1982

[51] Int. Cl.³ .............................................. G21C 3/34
[52] U.S. Cl. .................... 376/438; 376/446; 376/444; 376/441; 376/442
[58] Field of Search .............. 376/441, 442, 438, 462, 376/440, 444, 369, 362, 438, 446

[56] References Cited

U.S. PATENT DOCUMENTS

| 3,182,003 | 5/1965 | Thorp et al. ............... 376/441 X |
| 3,365,371 | 1/1968 | Lass et al. ................... 376/429 |
| 3,431,170 | 3/1969 | Lass et al. ................... 376/440 |
| 3,431,171 | 3/1969 | Glandin ..................... 376/441 X |
| 3,654,077 | 4/1972 | Lass et al. ................... 376/442 |
| 3,746,617 | 7/1973 | Iwao et al. .................. 376/442 |
| 3,762,996 | 10/1973 | Milburn et al. ............ 376/441 X |
| 3,801,452 | 4/1974 | Milburn ...................... 376/442 |
| 3,802,995 | 4/1974 | Fritz et al. .................. 376/440 |
| 3,833,471 | 9/1974 | Chetter ....................... 376/442 |
| 3,886,038 | 5/1975 | Raven ...................... 376/441 X |
| 3,984,284 | 10/1976 | Long et al. ................ 376/441 X |
| 4,081,324 | 3/1978 | Flora et al. ................. 376/441 |
| 4,089,742 | 5/1978 | Amaral et al. ............. 376/440 |
| 4,110,160 | 8/1978 | Hayashi et al. ............ 376/462 |
| 4,120,751 | 10/1978 | Bezold ....................... 376/441 |
| 4,152,205 | 5/1979 | Kropfl ....................... 376/441 |
| 4,175,004 | 11/1979 | Tabsen ...................... 376/441 |
| 4,314,884 | 2/1982 | Fanning et al. ............ 376/441 |

FOREIGN PATENT DOCUMENTS 959583 12/1974 Canada .

Primary Examiner—Richard E. Schafer
Assistant Examiner—Daniel Wasil
Attorney, Agent, or Firm—Ivor J. James, Jr.; Samuel E. Turner; Raymond G. Simkins

[57] ABSTRACT

In a fuel assembly for a nuclear reactor a fuel element spacer formed of an array of laterally positioned co-joined tubular ferrules each providing a passage for one of the fuel elements, the elements being laterally supported in the ferrules between slender spring members and laterally oriented rigid stops.

9 Claims, 17 Drawing Figures

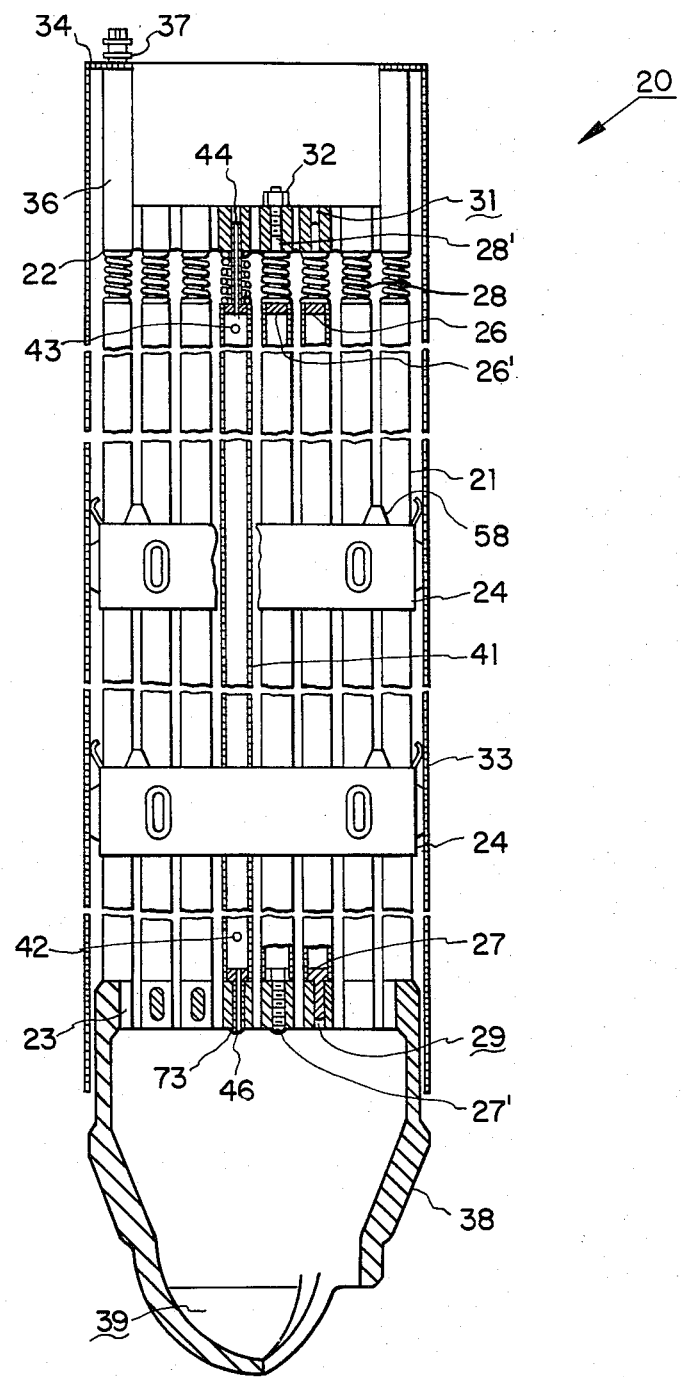
FIG._1

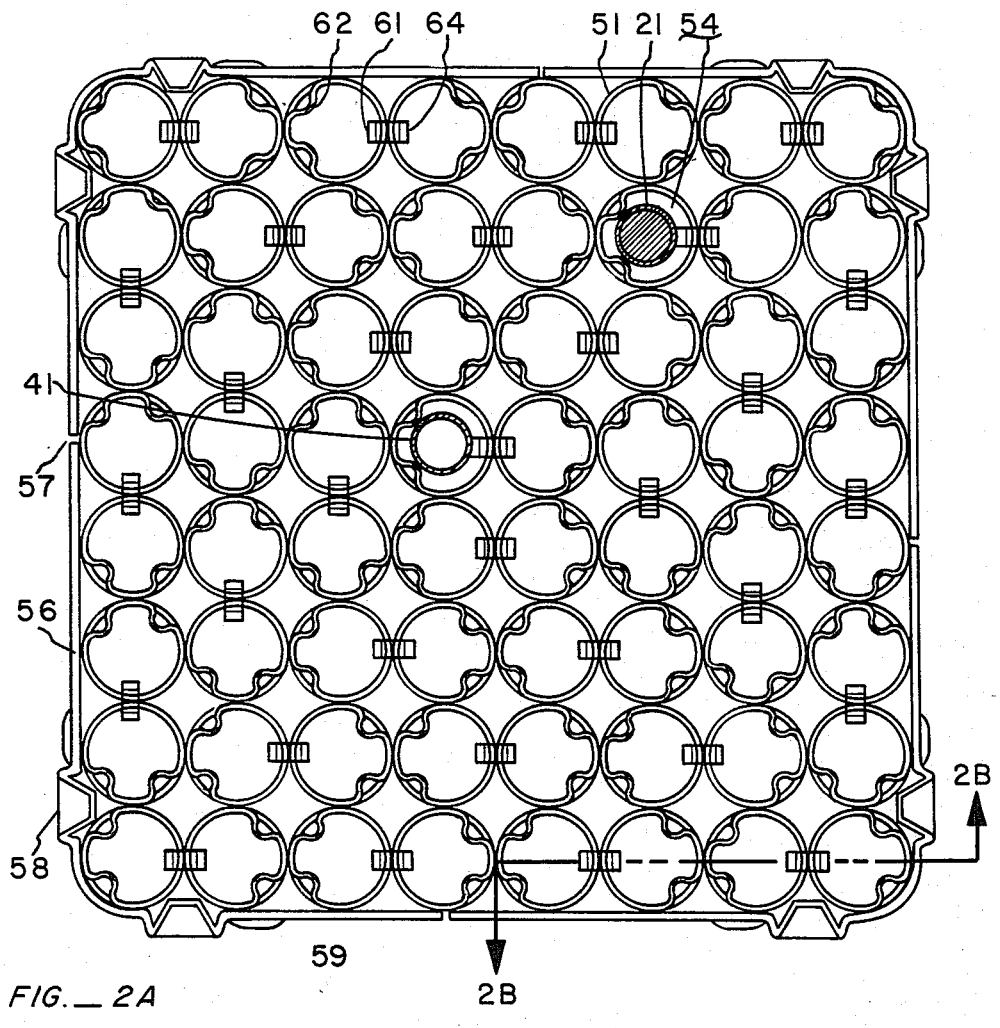
FIG._2A
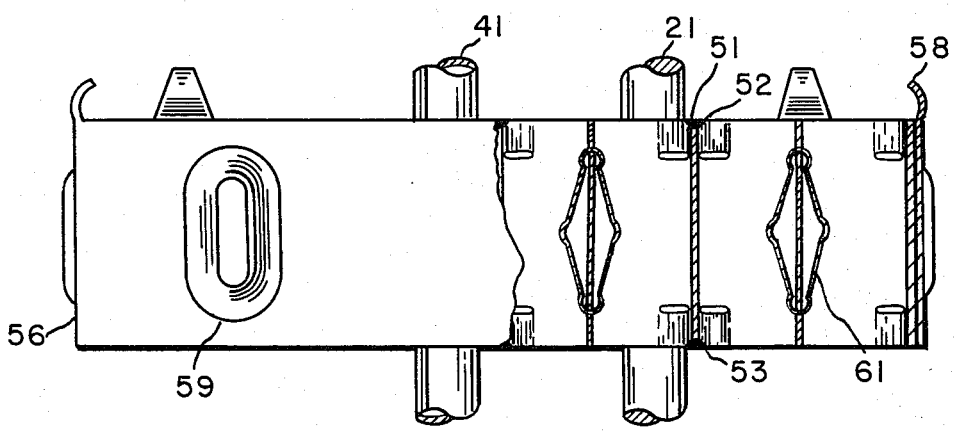
FIG._2B

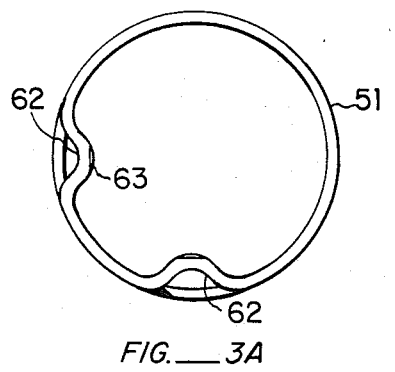
FIG._3A
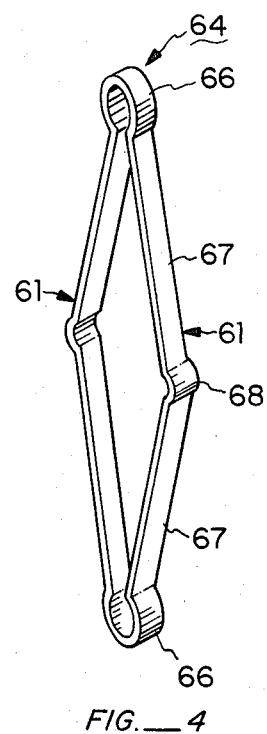
FIG._4
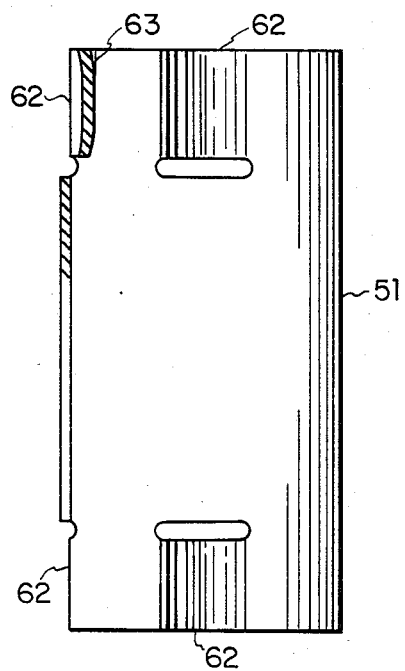
FIG._3B
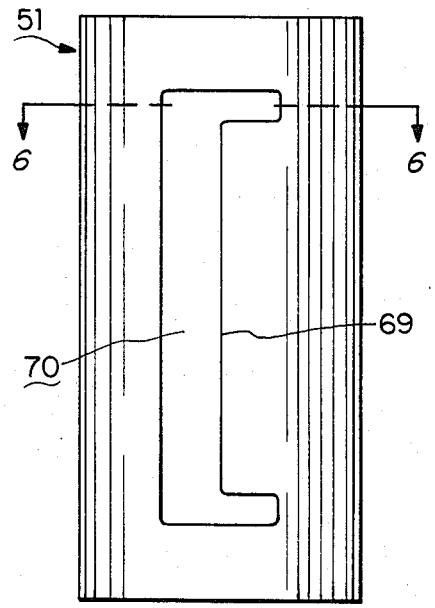
FIG._5

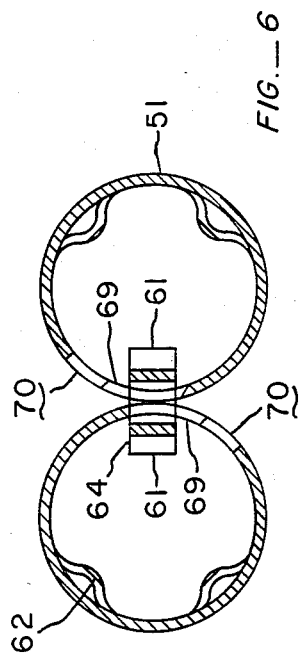
FIG._6
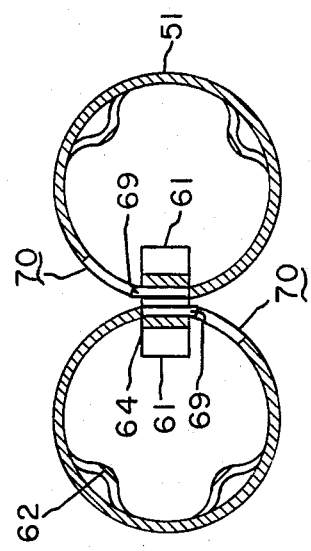
FIG._7
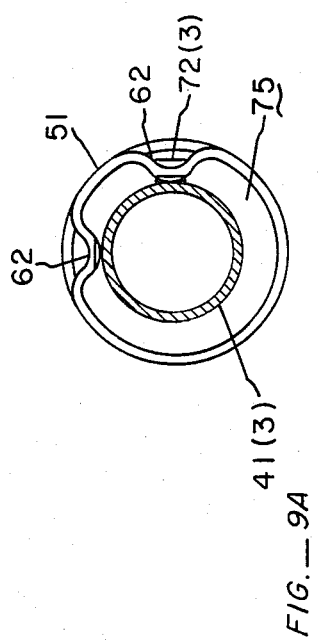
FIG._9A
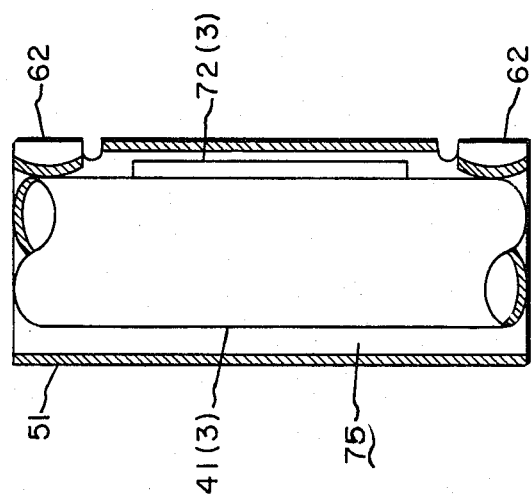
FIG._9B

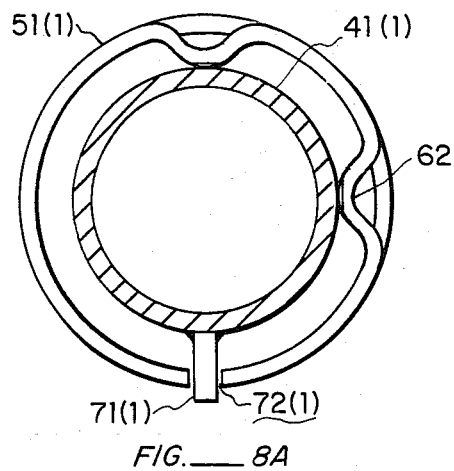
FIG.__8A
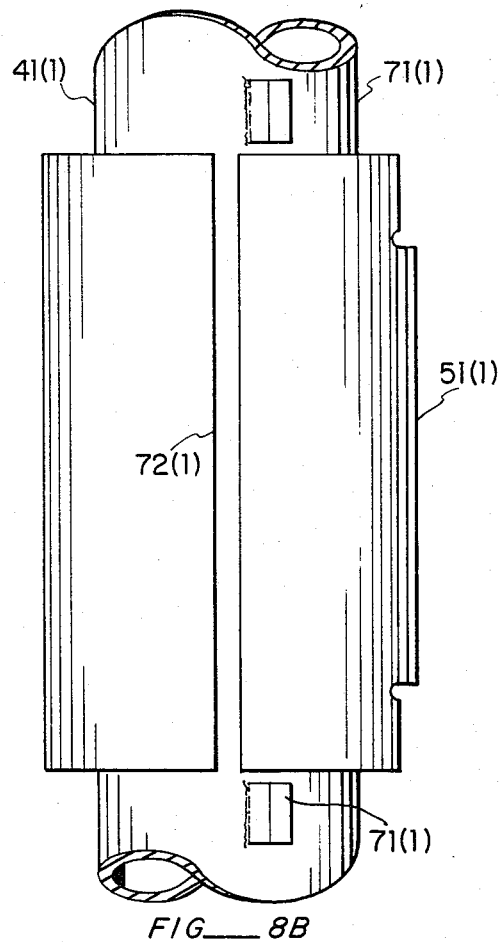
FIG.__8B
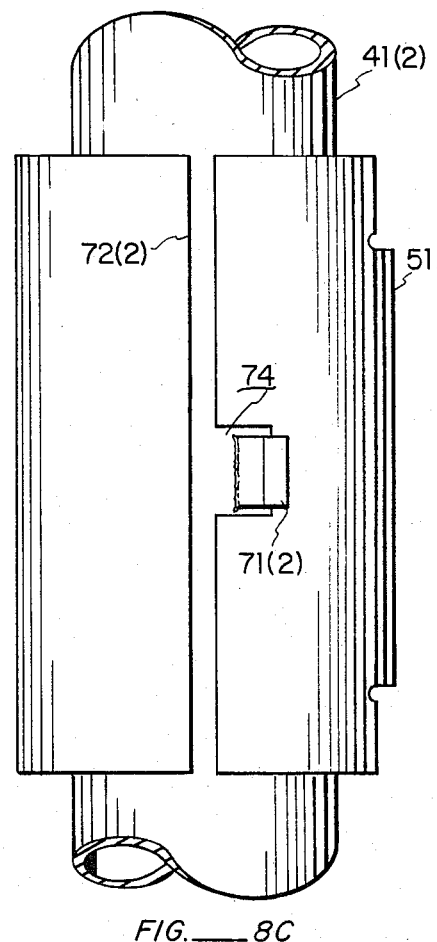
FIG.__8C

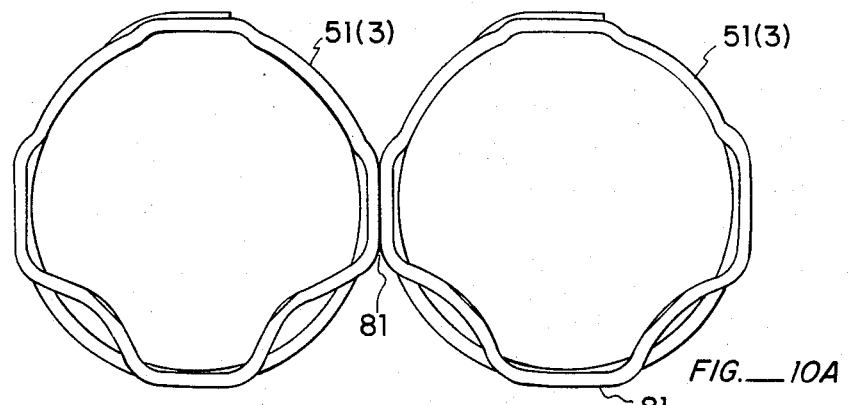
FIG.—10A
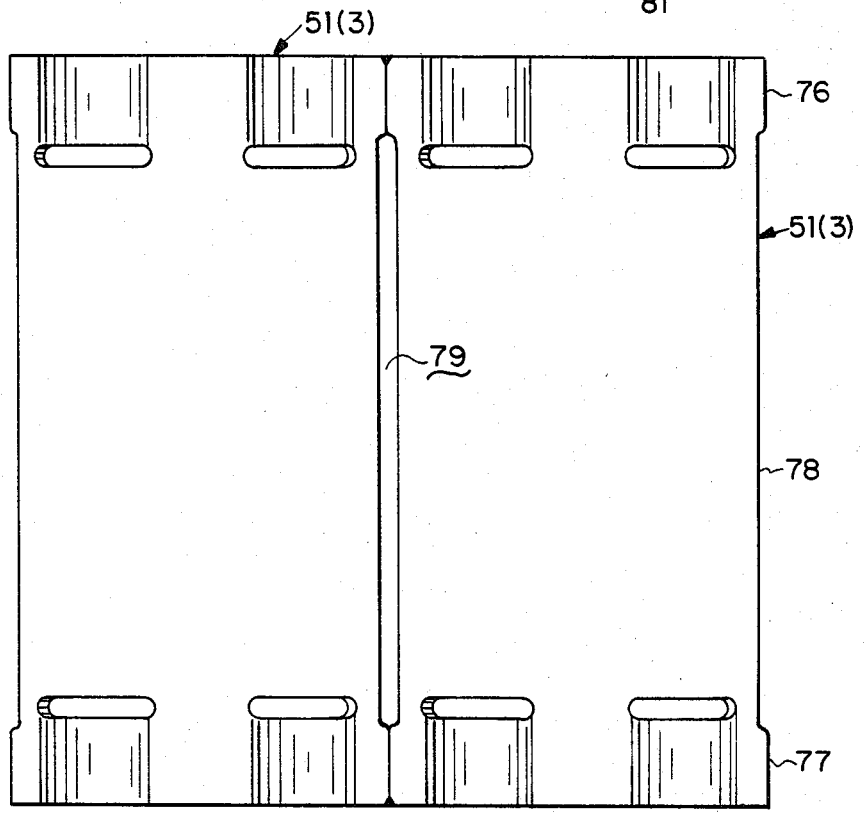
FIG.—10B

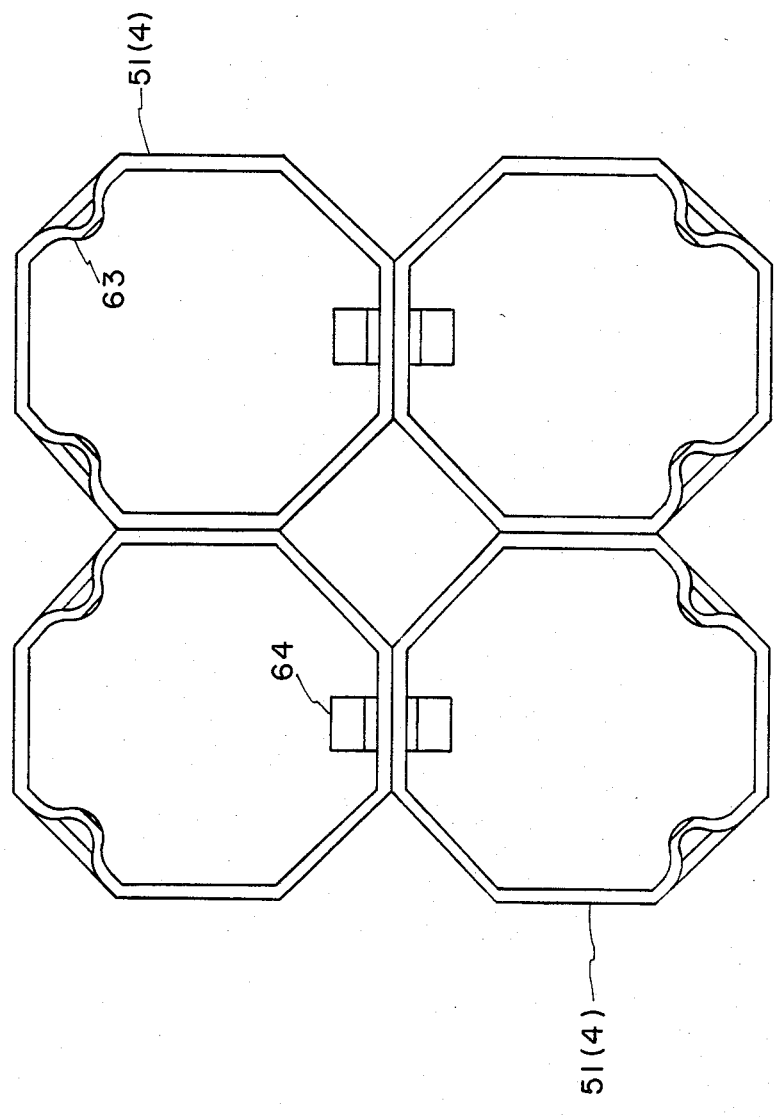

NUCLEAR FUEL ASSEMBLY SPACER

BACKGROUND

Nuclear power reactors are well known and are discussed, for example, by M. M. El-Wakil in "Nuclear Power Engineering", McGraw-Hill Book Company, Inc., 1962.

In a known type of nuclear power reactor, for example, as used in the Dresden Nuclear Power Station near Chicago, Illinois, the reactor core is of the heterogenous type. In such reactors the nuclear fuel comprises elongated rods formed of sealed cladding tubes of suitable material, such as a zirconium alloy, containing uranium oxide and/or plutonium oxide as the nuclear fuel, for example, as shown in U.S. Pat. No. 3,365,371. A number of such fuel rods are grouped together and contained in an open-ended tubular flow channel to form a separately removable fuel assembly or bundle as shown, for example, in U.S. Pat. No. 3,431,170. A sufficient number of fuel assemblies are arranged in a matrix, approximating a right circular cylinder, to form the nuclear reactor core capable of self-sustained fission reaction. The core is submerged in a fluid, such as light water, which serves both as a coolant and as a neutron moderator.

A typical fuel assembly is formed by an array of spaced fuel rods supported between upper and lower tie plates, the rods being several feet in length, on the order of one-half inch in diameter and spaced from one another by a fraction of an inch. To provide proper coolant flow past the fuel rods it is important to maintain the rods in spaced position and restrain them from bowing and vibrating during reactor operation. A plurality of fuel rod spacers spaced along the length of the fuel assembly are provided for this purpose.

Design considerations of such fuel rod spacers include the following: retention of rod-to-rod spacing; retention of fuel assembly shape; allowance for fuel rod thermal expansion; restriction of fuel rod vibration; ease of fuel bundle assembly; minimization of contact areas between the spacer and fuel rods; maintenance of structural integrity of the spacer under normal and abnormal (such as seismic) loads; minimization of reactor coolant flow distortion and restriction; maximization of thermal limits; minimization of parasitic neutron absorption; minimization of manufacturing costs including adaptation to automated production. Thus the need to provide such fuel rod spacers creates several significant problems two of which are parasitic neutron absorption and coolant flow restriction or pressure drop.

Any material, in addition to the nuclear fuel, that must be used in the construction of the reactor core unproductively absorbs neutrons and thus reduces reactivity with the result that an additional compensating amount of fuel must be provided. The amount of such parasitic neutron absorption is a function of the amount of the non-fuel material, of its neutron absorption characteristics, that is, its neutron absorption cross section, and of the neutron flux density to which it is exposed.

To remove the heat from the nuclear fuel, pressurized coolant is forced through the fuel assemblies of the reactor core. The fuel rod spacers in the assemblies act as coolant flow restrictors and cause an undesirable though inevitable coolant flow pressure drop. To maintain proper cooling of the fuel rods along their length and to minimize the required coolant pumping power it is desirable that spacer coolant flow resistance be minimized. The flow resistance of a spacer is a strong function of its projected or "shadow" area. Therefore, the flow resistance of a spacer can be minimized by minimizing the projected area of the structure of the spacer. Tests have shown that spacers employing minimized projected area also have the highest thermal limits.

As a practical matter the desire to minimize both parasitic neutron absorption and coolant flow restriction presents a conflict in fuel rod spacer design.

To minimize coolant flow restrictions, spacer members should be thin and of minimal cross section area. However, very thin members must be formed of high strength material to provide suitable spacer strength. Also, high strength material with suitable resilience characteristics must be used for any spring member portions of the spacer. It is found that such suitable materials have relatively high neutron absorption characteristics.

On the other hand, materials of desirably low neutron absorption characteristics are found to be of relatively low strength, difficult to form and lacking the resiliency desired for the spring member portions of the spacer.

An approach toward the resolution of the foregoing design conflict is a "composite" spacer wherein the structural members are formed of a material having a low neutron absorption cross section and the spring members thereof are separately formed of suitably resilient material whereby the amount of high neutron absorption cross section material is minimized.

A variety of such fuel rod spacers have been proposed and used. An example is shown in U.S. Pat. No. 3,654,077. The spacer shown therein (especially the embodiment of FIGS. 5 and 6 thereof) has enjoyed long commerical success. In the spacer thereof the peripheral support member and the divider members are formed of low neutron cross section material such as zirconium. The divider members are skeletonized, i.e., formed with cutouts, to further reduce neutron loss. To minimize the amount of high neutron cross section spring material in the spacer, a single spring member projects into each of the fuel rod passages, the springs being in the form of four-sided assemblies.

Another example of a spacer design is shown in U.S. Pat. No. 3,886,038.

The core of a large nuclear power reactor typically contains in the order of 800 fuel assemblies each of which may have seven spacers. Thus it can be appreicated that even small decreases in spacer flow resistance and neutron capture can have a significant effect on the core as a whole.

Decreased flow resistance means that less coolant recirculation pumping power is needed. For example, in a 1000 MWe (megawatt electric) plant, a reduction of core flow resistance of one psi can save as much as 350 kWe of power.

Decreased parasitic neutron absorption in the spacers means that less core reactivity is needed for a given power output. In other words, fuel of lower enrichment can be used. For example, a 0.01 percent decrease in enrichment can lower the cost of the fuel by in the order of $1000.00 per assembly.

An object of this invention is a nuclear fuel element spacer providing decreased coolant flow resistance and decreased neutron absorption.

Another object is to decrease the projected area of a spacer structure.

Another object is to minimize changes in the cross section area of the spacer structure.

Another object is to securely retain the spring members of a spacer.

Another object is to minimize axial discontinuities in the spacer structure whereby accelerations and decelerations of the coolant flow through the spacer is minimized.

Another object is to avoid projections of springs or other spacer structure above or below the lateral planes defined by the upper and lower edges of major spacer structure.

SUMMARY

These and other objects of the invention are achieved by a spacer formed of an array of cojoined tubular ferrules surrounded by a peripheral support band, each ferrule thus providing a passage or cell for a fuel rod or other elongated element of the fuel assembly.

The welded-together ferrules and peripheral support band provide a structure of high structural strength whereby the thickness of the metal used to form the peripheral support band and ferrules can be minimized to reduce coolant flow resistant and parasitic neutron absorption.

Neutron absorption is further decreased by forming the ferrules and peripheral support band of low neutron cross section material.

The rods or elements extending through the ferrules are centered and laterally supported therein between rigid stops and resilient members. The rigid projections or stops may take the form of arched portions of the walls of the ferrules. Preferably, these arched portions are formed near the upper and lower edges of the ferrules to maximize the axial distance therebetween to enhance support of the element.

Also, these arched portions are, preferably, laterally oriented for minimization of projected area and, thus, least disturbance of coolant flow.

The resilient members may take the form of slender, continuous loop springs of generally elliptical shape supported by oppositely directed tabs formed by C-shaped cutouts in the walls of adjacent ferrules whereby the two sides of each spring member project into adjacent ferrules. In this manner, the springs may be relatively short to minimize the amount of high neutron capture cross section material from which they must be formed and projection of the springs above or below the upper or lower edges of the ferrules is avoided to minimize coolant flow disturbance.

In the preferred embodiment a single spring member projects into each ferrule and urges the element extending therethrough into contact with two axially spaced pairs of laterally spaced rigid projections or stops.

In one embodiment of the invention the ferrules are of constant cross section dimensions (e.g. constant diameter) along their length. Thus, adjacent ferrules contact one another along a vertical line.

In another embodiment, the cross section dimension of the upper and lower end portions of the ferrules where they are joined is greater than the major body portion of the ferrules whereby the body portions of adjacent ferrules are spaced slightly from one another. This allows some coolant circulation between the body portion of adjacent ferrules to discourage crud and corrosion product buildup between adjacent ferrules.

Except for flow channel lead-in tabs projecting upward and inward from the peripheral support band, there are no springs or other spacer members projecting beyond the upper and lower lateral planes defined by the upper edges of the array of ferrules. This aids in avoiding turbulence producing changes in cross section area of the structure of the spacer.

DRAWING

The invention is described more specifically hereinafter with reference to the accompanying drawing wherein:

FIG. 1 is a elevation view, partly in section of a nuclear fuel bundle; FIG. 2A is a plan or top view of a fuel rod spacer of the invention;

FIG. 2B is an elevation view, partly in section of the spacer of FIG. 2A;

FIG. 3A is a plan view of an individual one of the ferrules used in the spacer of FIG. 2A;

FIG. 2B is a partly cut away elevation view of the ferrule of FIG. 3A;

FIG. 4 is an isometric view of a double-sided spring member as used in the spacer of FIGS. 2A/2B.

FIG. 5 is an elevation view of a ferrule of the spacer of the invention illustrating the spring member supporting tab formed by a C-shaped cutout in the side wall of the ferrule;

FIG. 6 is a transverse cross sectional view of a pair of adjacent ferrules of the spacer of the invention illustrating support of the spring member of FIG. 4;

FIG. 7 is a transverse cross sectional view of a pair of adjacent ferrules wherein the spring supporting tabs are flattened;

FIG. 8A is a plan view of a ferrule of the spacer of FIG. 2A as modified to accommodate a spacer retaining moderator tube;

FIG. 8B is an elevation view of the ferrule of FIG. 8A illustrating one version of a spacer retaining arrangement;

FIG. 8C is an elevation view of the ferrule of FIG. 8A illustrating another version of a spacer retaining arrangement.

FIGS. 9A and 9B are a plan and cut away elevation view, respectively, illustrating a third version of a spacer retaining arrangement;

FIGS. 10A is a top or plan view of a pair of adjacent ferrules having reduced diameter body portions which can be used alternatively in the spacer of the invention;

FIG. 10B is an elevation of the ferrules of FIG. 10A; and

FIG. 11 is a plan view of adjacent ferrules of octagonal transverse cross section shape useable in the spacer of the invention.

DESCRIPTION

A fuel assembly 20 is illustrated in elevation view in FIG. 1. The fuel assembly 20 comprises a plurality of fuel elements or rods 21 supported between a skeletonized upper tie plate 22 and a skeletonized lower tie plate 23. The fuel rods 21 pass through a plurality of fuel rod spacers 24 which provide intermediate support to retain the elongated rods in spaced relation and restrain them from lateral vibration.

Each of the fuel rods 21 is formed of an elongated tube containing fissile fuel and other materials, such as fertile fuel, burnable poison, inert material or the like, sealed in the tube by upper and lower end plugs 26 and 27. Lower end plugs 27 are formed with extensions for registration and support in support cavities 29 formed in the lower tie plate 23. Upper end plugs 26 are formed with extensions 28 which fit into support cavities 31 in the upper tie plate 22.

Several of the support cavities 29 (for example, selected ones of the edge of peripheral cavities) in the lower tie plate 23 are formed with threads to receive fuel rods having threaded lower end plug extensions 27'. Extensions 28' of upper end plugs 26' of these same fuel rods are elongated to pass through the cavities in the upper tie plate 22 and are formed with threads to receive retaining nuts 32. In this manner the upper and lower tie plates and the fuel rods are formed into a unitary structure.

The fuel assembly 20 further includes a thin-walled tubular flow channel 33, of substantially square cross section, sized to form a sliding fit over the upper and lower tie plates 22 and 23 and the spacers 24 so that the channel 33 readily may be mounted and removed. Fixed to the top end of the flow channel 33 is a tab 34 by which the channel is fastened to a standard 36 of upper tie plate 22 by means of a bolt 37.

The lower tie plate 23 is formed with a nose piece 38 adapted to support the fuel assembly 20 in a socket in a core support plate (not shown) in the reactor pressure vessel. The end of this nose piece is formed with openings 39 to receive the pressurized coolant so that it flows upwardly among the fuel rods.

As shown in FIG. 1, one (or more) of the fuel rods 21 in the inner fuel rod positions may be replaced by a moderator tube 41. The moderator tube 41 may be similar in construction to a fuel rod but designed to contain a neutron moderator. For example, it may be apertured, as shown at 42 and 43, and/or the upper and lower end plugs thereof may be formed with passages 44 and 46 to permit flow of water-moderator therethrough.

The spacer 24, to which this invention is directed, is shown generally in plan view in FIG. 2A and in partly cutaway elevation view in FIG. 2B.

The spacer 24 is made up of a plurality of ferrules 51 arranged in abutting relation (for example, in rows and columns) and cojoined, for example, by welding together the upper and lower edges of abutting portions of adjacent ferrules (as at 52, 53 in FIG. 2B).

Each of the ferrules 51 provides a passage 54 for an elongated element of the fuel assembly such as fuel rod 21, moderator tube 41 or the like.

As illustrated in FIGS. 2A, 2B each of the ferrules 51 may be formed of a short section of circular cross section preferably seamless tubing.

Fixed to peripheral ferrules of the then formed array of ferrules is a peripheral band 56. Conveniently, the peripheral support band 56 may be formed of four similar L-shaped pieces each positioned at a corner of the ferrule array and meeting at the center of an outer ferrule as at 57 (FIG. 2A).

The peripheral band 56 of the spacer 24 is formed with a pair of inwardly curved, outward and upward projections 58 near each corner to serve as lead-ins when the removable tubular flow channel 33 (FIG. 1) is installed over the fuel assembly 20. It is a feature of the invention that, except for the lead-in projections 58, there are no springs or other spacer structure projecting above or below the planes of the upper and lower edges of the ferrules 51 and peripheral band 56 whereby coolant flow disturbances due to velocity changes caused by changes in spacer cross section area are minimized.

The peripheral band 56 also is formed with a pair of outwardly extending lobes 59 near each corner for providing predetermined spacing between the band 56 and the surrounding coolant flow channel 33.

Each fuel rod 21, or other elongated element, extending through one of the passages 54 formed by the ferrules 51 is centered and laterally supported therein between a resilient spring member 61 and generally oppositely positioned spaced pairs of relatively rigid projections or stops 62 (FIG. 2A).

The stops 62 are more clearly shown in FIGS. 3A, 3B which are plan and elevation views of one of the ferrules 51. Preferably the stops 62 are formed integrally with the ferrule 51, that is, they are formed as laterally spaced pairs of arched portions of the ferrule walls near the upper and lower edges of the ferrule. Preferably the stops 62 are laterally oriented to minimize spacer projected area and coolant flow resistance. Also it is preferred that the upper and lower edges 63 of the apex of the stops 62 be curved slightly outward from the passage 54 (i.e. the stops are slightly convex in the vertical direction) to facilitate entry into and removal from the passages 54 of the fuel rods 21 and to minimize scratching thereof.

Advantageously, each spring member 61 may be one side of a double-sided, continuous-loop spring 64 as illustrated in FIG. 4. Conveniently, the stock from which such a spring may be formed is a section of seamless tubing. The springs 64 are supported in the spacer by tabs formed in adjacent ferrules 51 as described hereinafter.

The spring 64 is formed with arched upper and lower end portions 66. The two sides of the end portions 66 are spaced apart at their closest point about the thickness of the tabs on which the spring 64 is mounted in the spacer. Major middle portions 67 are outwardly bowed to extend into the passages 54 and are formed with central apex portions 68 for contact with the element (e.g. fuel rod) extending through the passages. The arched end portions 66 extend outwardly to a lesser extent than middle portions 67 for limiting extreme movement of a fuel rod or other element in the direction of the spring 64.

FIG. 5 is an elevation view of a ferrule 51 illustrating how tabs 69 for mounting the springs 64 in the spacer 24 are formed in the walls of the ferrules 51 by a C-shaped cutout 70.

FIG. 6 is a transverse cross section view (taken along the line 6—6, FIG. 5) of a pair of adjacent ferrules 51 illustrating how one of the springs 64 is engaged and supported by the tabs 69 of the adjacent ferrules 51. To accomplish this mounting of the spring 64 on the tabs 69, the ferrules 51 are rotated so that their tabs 69 are facing one another and extending in opposite directions. One side of the spring 64 is inserted through the vertical portion of the C-shaped cutout of a first one of the ferrules 51 and the spring 64 is then moved laterally over the tab 69 of that ferrule. With the spring and the first ferrule held stationary in this position, the other side of the spring is inserted through the vertical portion of the C-shaped cutout of the second one of the ferrules 51 and this second ferrule is then rotated to insert its tab 69 through the spring 64. In this manner the oppositely directed tabs 69 of the adjacent ferrules locate and secure the spring 64 in its proper position.

An outstanding advantage of this spring mounting arrangement is that all of the ferrules 51 (with the exception of some embodiments the ferrule which receive the spacer retaining element as discussed hereinafter) are alike (i.e. substantially similar in construction) with consequent minimization of production equipment and cost.

In the embodiment of FIG. 6, the spring mounting tabs 69 remain arcuate in shape (i.e. retaining the radius of the ferrule 51). In an alternate embodiment shown in FIG. 7, tabs 69' are flattened or straightened. This embodiment is useful where it is desirable to minimize the spacing between opposite sides of the end portions 66 of the spring 64.

With reference to FIG. 1, it is a design requirement for the fuel assembly 20 that the spacers 24 be retained in their proper, spaced axial position. Typically this is accomplished by providing radially extending lugs on one of the elongated elements, these lugs engaging the spacers to limit their axial movement. Preferably, the elongated element to which such lugs are fixed is a non-fueled element such as the moderator tube 41. Such a spacer retaining arrangement is shown by J. R. Fritz et al in U.S. Pat. No. 3,802,995. Three versions of spacer retaining arrangements adapted for use with the spacer of the invention will now be discussed.

Illustrated in FIGS. 8A and 8B is a ferrule 51(1) adapted to accommodate a moderator tube 41(1) fitted with radially extending lugs 71(1). As best seen in FIG. 8B, the ferrule 51(1) is formed with a slot 72(1) for receiving and passing the lugs 71(1), the lugs 71(1) being arranged as vertically spaced pairs, the pairs being located appropriate to the proper location of the spacers and the lugs of each pair being spaced apart somewhat more than the height of the spacer.

Upon installation the lug bearing moderator tube 41(1) is inserted in turn through each of the ferrules 51(1) of the series of spacers, the lugs 71(1) being then radially oriented to pass through the slots 72(1) of the spacers. When each spacer is properly positioned between its pair of lugs 71(1), the moderator tube 41(1) is rotated (counterclockwise from the position shown in FIG. 8A) to bring lugs 71(1) out of alignment with the slot 72(1), the spacer thereby being retained between the upper and lower lugs of the pair.

To prevent rotation of the moderator tube 41(1) from its spacer retaining position (as shown in FIG. 3B) the shank 73 of the lower (or upper) end plug of the moderator tube (see FIG. 1) may be formed with an other than circular transverse cross section (e.g. square, hexagonal, etc.) and be fitted in a mating cavity in the lower tie plate 23 as more fully described in the aforementioned U.S. Pat. No. 3,802,995.

A modified version of the spacer retaining arrangement is illustrated in FIG. 8C. In this version the moderator tube 41(2) is fitted with a single lug 71(2) for each of the spacers 24. In addition to the vertical slot 72(2) the ferrule 51(2) is formed with a cutout 74 extending from one side of the slot for engaging the lug 71(2) when the moderator tube 41(2) is rotated to the spacer retaining position. The moderator tube may be installed through the spacers and retained in its rotated position as described hereinbefore.

Another version of a spacer retaining arrangement is illustrated in FIGS. 9A and 9B. This version has the advantage that no modification of the ferrule 51 is required. The moderator tube 41(3) is fitted with relatively wide and relatively long lugs 72(3), one for each spacer 24. The radial dimension of the lugs 72(3) is limited so that the lugs 72(3) can pass through the annular space 75 between the outside of the moderator tube 41(3) and the inside of the ferrule 51. The moderator tube 41(3) is then rotated so that the lugs 72(3) are in vertical alignment with vertically aligned upper and lower pairs of the stops 62 (described hereinbefore) whereby axial movement of each spacer 24 is limited to the vertical spacing between the lug 72(3) and the upper and lower stops 62.

The moderator tube 41(3) can be retained in its rotated position by, for example, a shaped end plug shank as discussed hereinbefore with reference to the spacer retaining version of FIGS. 8A and 8B.

In an alternate embodiment of the spacer of the invention, as illustrated by the plan and elevation views of a pair of adjacent ferrules 51(3) in FIGS. 10A and 10B, the upper and lower end portions 76, 77 of the ferrules are of greater transverse cross section dimensions (e.g. diameter) than the major body portion 78. This provides a space or gap 79 between adjacent ferrules 51(3) which allows some coolant circulation for the purpose of discouraging crud buildup between the ferrules.

Advantageously, as shown in FIG. 10A, the contacting portions 81 of the adjacent ferrules 51(3) where they are joined, are flattened to provide a contacting surface.

In the embodiments of the invention described and illustrated thus far, the ferrules 51, which make up the spacer of the invention, are shown as having a substantially circular transverse cross section shape. However, ferrules of other cross section shapes are suitable as well. For example, ferrules 51(4) of octagonal shape, as illustrated in FIG. 11, can be used.

EXAMPLE

In an example design of the spacer of the invention as illustrated in FIGS. 2A, 2B, the spacer is about 5.25 inches (13.3 cm) square. The ferrules 51 and peripheral band 57 are about 1.2 inches (3 cm) high and are formed of a material of low neutron absorption cross section such as a zirconium alloy, for example, Zircaloy-4. The ferrules 51 are about 0.64 inches (16.2 mm) in outside diameter with a wall thickness of about 0.02 inches (0.5 mm).

The spring 64 is formed of a material having suitable strength, corrosion resistance and resilience characteristics such as a nickel alloy, for example, Inconel. The spring 64 is about 0.8 inches (2 cm) high, about 0.1 inches (2.5 mm) wide and formed of a material of about 0.012 inches (0.3 mm) thick.

Thus what has been described is a nuclear fuel element or rod spacer wherein the total amount of material, the amount of high neutron cross section material, the projected area of the spacer structure, and changes in cross section area of the spacer structure are minimized to minimize neutron absorption and coolant/moderator flow resistance. The nested cojoined ferrules provide a structure of superior strength whereby the thickness of material from which they are formed can be reduced. Also the spacer lends itself to economical manufacture.

We claim:

1. In a fuel assembly for a nuclear reactor including a plurality of elongated elements, a spacer for retaining said elements in lateral position, comprising:

a plurality of laterally positioned, cojoined tubular ferrules, each of said ferrules providing a passage for a respective one of said elements, each ferrule being joined to adjacent ferrules at each end, the diameter of said ferrules at their end portions where they are joined together being greater than the diameter of the body portions of said ferrules between said ends, thereby to leave a limited space between said body portions for coolant flow between said ferrules.

2. The spacer of claim 1 wherein the local areas of said end portions of said ferrules where said ferrules are joined together are flattened to provide limited areas of contact between adjacent ferrules.

3. A fuel assembly for a nuclear reactor comprising a plurality of elongated elements positioned in spaced array between upper and lower tie plates, at least one spacer positioned intermediate said upper and lower tie plates to provide lateral support for said elements, said spacer comprising a plurality of laterally positioned, conjoined tubular ferrules each providing a passage for a respective one of said elements, a selected one of said elements being fitted with a laterally extending lug, the ferrule providing a passage for said selected one of said elements being formed with a vertical slot to provide a passage through said ferrule for said laterally extending lug, a lateral cutout in ferrule wall adjacent said slot for receiving said lug when it is inserted into said slot and said selected one of said elements is rotated to move said lug into said cutout, and antirotation means to prevent subsequent rotation of said one of said elements whereby engagement of said lug in said cutout retains said spacer in its position intermediate said upper and lower tie plates.

4. The fuel assembly of claim 3 wherein said antirotation means includes a shaped end plug on said selected one of said elements and a mating receptable for receiving said shaped end plug in one of said tie plates.

5. The fuel assembly of claim 3 wherein said selected one of said elements is devoid of nuclear fuel.

6. The fuel assembly of claim 3 wherein said selected one of said elements contains an axial chamber for receiving neutron moderator.

7. A fuel assembly for a nuclear reactor comprising a plurality of elongated elements positioned in spaced array between upper and lower tie plates, at least one spacer positioned intermediate said upper and lower tie plates to provide lateral support for said elements, said spacer comprising a plurality of laterally positioned, cojoined tubular ferrules each providing a passage for one of said elements, a selected one of said elements being fitted with a pair of laterally extending lugs, the lugs of the pair being vertically spaced apart about the height of said spacer, the ferrule providing a passage for said selected one of said elements being formed with a vertical slot to provide a passage through said ferrule for said lugs whereby when one of said lugs is passed through said slot and said one of said elements is rotated so that said lugs are out of alignment with said slot said spacer is retained between the upper and lower lugs of said pair of said lugs in its position intermediate said upper and lower tie plates, and antirotation means to prevent subsequent rotation of said one of said elements whereby said lugs are kept out of alignment with said slot.

8. The fuel assembly of claim 7, wherein said antirotation means includes a connection between said one of said elements and one of said tie plates for preventing rotation of said one of said elements.

9. The fuel assembly of claim 7, wherein said fuel assembly is adapted for use in a water cooled and moderated nuclear reactor and wherein said one of said elements is a hollow tube with apertures for entrance and exit of water.

* * * * *